United States Patent
Lee et al.

(10) Patent No.: US 7,110,217 B2
(45) Date of Patent: Sep. 19, 2006

(54) WRITE HEAD DESIGN WITH IMPROVED BUMP TO CONTROL WRITE SATURATION

(75) Inventors: Edward Hin Pong Lee, San Jose, CA (US); Katalin Pentek, San Jose, CA (US); Yong Shen, Saratoga, CA (US); Sue Siyang Zhang, Saratoga, CA (US)

(73) Assignee: Hitachi Global Storage Technologies, Amsterdam (NL)

( * ) Notice: Subject to any disclaimer, the term of this patent is extended or adjusted under 35 U.S.C. 154(b) by 238 days.

(21) Appl. No.: 10/687,284

(22) Filed: Oct. 15, 2003

(65) Prior Publication Data
US 2005/0083606 A1 Apr. 21, 2005

(51) Int. Cl.
*G11B 5/147* (2006.01)
(52) U.S. Cl. ...................................... 360/126
(58) Field of Classification Search ................ 360/126, 360/123, 121, 125
See application file for complete search history.

(56) References Cited

U.S. PATENT DOCUMENTS

| | | | |
|---|---|---|---|
| 5,751,522 A * | 5/1998 | Yamada et al. ............. 360/317 |
| 6,029,339 A | 2/2000 | Chang et al. ............. 29/603.14 |
| 6,185,081 B1 | 2/2001 | Simion et al. ............ 360/327.3 |
| 6,301,076 B1 * | 10/2001 | Stageberg et al. ........... 360/126 |
| 6,404,601 B1 | 6/2002 | Rottmayer et al. .......... 360/317 |
| 6,542,331 B1 * | 4/2003 | Chang et al. ................ 360/126 |
| 6,683,750 B1 * | 1/2004 | Sato .......................... 360/126 |
| 6,751,055 B1 * | 6/2004 | Alfoqaha et al. ............ 360/126 |
| 6,765,757 B1 * | 7/2004 | Kawasaki et al. ........... 360/126 |
| 2002/0015266 A1 | 2/2002 | Han et al. .................... 360/317 |
| 2002/0026705 A1 | 3/2002 | Santini .................... 29/603.12 |
| 2002/0131205 A1 * | 9/2002 | Gotoh et al. ................ 360/126 |
| 2003/0048582 A1 * | 3/2003 | Kanada et al. .............. 360/126 |
| 2003/0072104 A1 * | 4/2003 | Sato et al. .................. 360/126 |
| 2003/0147176 A1 * | 8/2003 | Gotoh et al. ................ 360/126 |
| 2004/0070876 A1 * | 4/2004 | Yazawa ...................... 360/126 |
| 2004/0095676 A1 * | 5/2004 | Sato et al. .................. 360/126 |

* cited by examiner

*Primary Examiner*—Allen Cao
(74) *Attorney, Agent, or Firm*—Zilka-Kotab, PC (57) ABSTRACT

A magnetic head having an air bearing surface (ABS) and a first pole tip. A second pole tip is spaced apart from and facing the upper end of the first pole tip across a write gap. A bump extends into a portion of the upper end of the first pole tip and a portion of the bottom end of the second pole tip, the bump being positioned away from the ABS. The bump defines a throat height of the first and second pole tips.

25 Claims, 7 Drawing Sheets

WRITE HEAD DESIGN WITH IMPROVED BUMP TO CONTROL WRITE SATURATION

FIELD OF THE INVENTION

The present invention relates to write heads, and more particularly, this invention relates to a write head having an integrated bump that defines pole tip throat heights for controlling write saturation.

BACKGROUND OF THE INVENTION

A typical magnetic disk drive includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic transitions to and reading magnetic signal fields from the rotating disk. The read and write heads are connected to processing circuitry that operates according to a computer program to implement the writing and reading functions.

Figure 1:
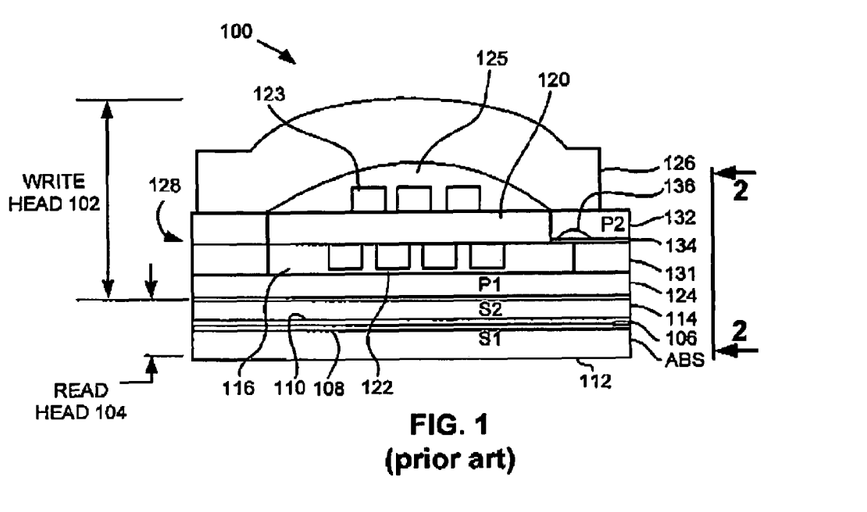
FIG. 1 is a partial view of a magnetic head.
Figure 2:
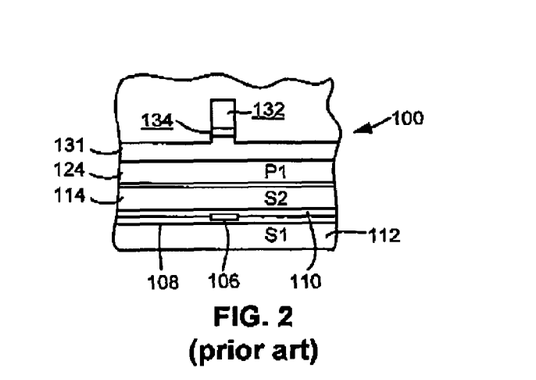
FIG. 2 is a partial ABS view, not to scale, of the slider taken along plane 2—2 of FIG. 1 to show the read and write elements of the magnetic head.

FIG. 1 is a side cross-sectional elevation view of a piggyback magnetic head 100, which includes a write head portion 102 and a read head portion 104, the read head portion employing a spin valve sensor 106. FIG. 2 is an air bearing surface (ABS) view of FIG. 1. The spin valve sensor 106 is sandwiched between nonmagnetic electrically insulative first and second read gap layers 108 and 110, and the read gap layers are sandwiched between ferromagnetic first and second shield layers 112 and 114. In response to external magnetic fields, the resistance of the spin valve sensor 106 changes. A sense current ($I_s$) conducted through the sensor causes these resistance changes to be manifested as potential changes. These potential changes are then processed as readback signals by processing circuitry.

The write head portion 102 of the magnetic head 100 includes a first coil layer 122 embedded in a first insulation layer 116. A second insulation layer 120 is employed to planarize the head after the second pole tip process so that a subsequent second layer coil can be formed on a substantially planar surface. A second coil layer 123 is embedded in a third insulation layer 125. The first, second, and third insulation layers are referred to in the art as an "insulation stack". The coil layers 122, 123 and the first, second and third insulation layers 116, 120 and 125 are sandwiched between first and second pole piece layers 124 and 126. The first and second pole piece layers 124 and 126 are magnetically coupled at a back gap 128 and have first and second pole tips 131 and 132 which are separated by a write gap layer 134 at the ABS. In a merged head, the second shield layer 114 and the first pole piece layer 124 would be a common layer.

In a conventional design, a bump 136 is formed on the write gap layer 134 to form a stitched structure. However, there are certain limitations on creating the bump 136. One problem encountered when attempting to form this bump 136 is that small variations of the bump 136 have a dramatic effect on the write function. Particularly, if the bump 136 is too tall in a direction parallel to the ABS, the amount of magnetic material on the top of the bump will be reduced. The large topography of a large bump height also makes if difficult to form the track width of the second pole tip 132 due to the reflective light during the photolithography process. If the bump 136 is too short, leakage across the write gap occurs, which in turn reduces write efficiency.

What is needed is a structure that has a height sufficient to separate the first and second pole tips 131 and 132, but at the same time not creating too much topography when the second pole tip 132 and second pole piece layer 126 are formed.

What is also needed is a bump structure that provides controlled P1 saturation.

What is further needed is a structure that has a reduced throat height to improve write efficiency for lower track width/write gap length used in future high density heads.

What is still further needed is a bump formed using a dry process for good throat height definition.

SUMMARY OF THE INVENTION

The present invention allows a magnetic head to have a narrow track width and short throat height. Narrow track widths and short throat heights will be required by future longitudinal write heads as described in Yimin Hsu et al, TMRC 2003, Santa Clara University.

According to one embodiment of the present invention, a head has an air bearing surface (ABS) and a first pole tip. A second pole tip is spaced apart from and facing the upper end of the first pole tip across a write gap. A bump extends into a portion of the upper end of the first pole tip and a portion of the bottom surface of the second pole tip, the bump being positioned away from the ABS. The bump defines a throat height of the first and second pole tips with substantially less topography than was heretofore known. This reduced topography makes pole process more robust for P2 track width control. Also, sufficient separation is created between the first and second pole tips in the bump region to ensure sufficient magnetic separation in a short effective throat height.

The bump may have many shapes, such as a generally circular shape, a generally oval shape, a generally triangular shape, or a generally trapezoidal shape with or without an end tapering (rounded or angled) towards the pole tips. In one embodiment, the bump is relatively short. In another embodiment, the bump extends in a direction away from the ABS but before the back gap of the magnetic head.

The bump is constructed of a nonmagnetic material such as alumina, a nonmagnetic metal (electrically conductive or nonconductive), and/or cured photoresist. Preferably, the bump is formed using a dry process such as by vacuum deposition. Using a dry process of bump formation provides an advantage in position control, resulting in better throat control, which is critical for short throat height writers.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior Art

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 3:
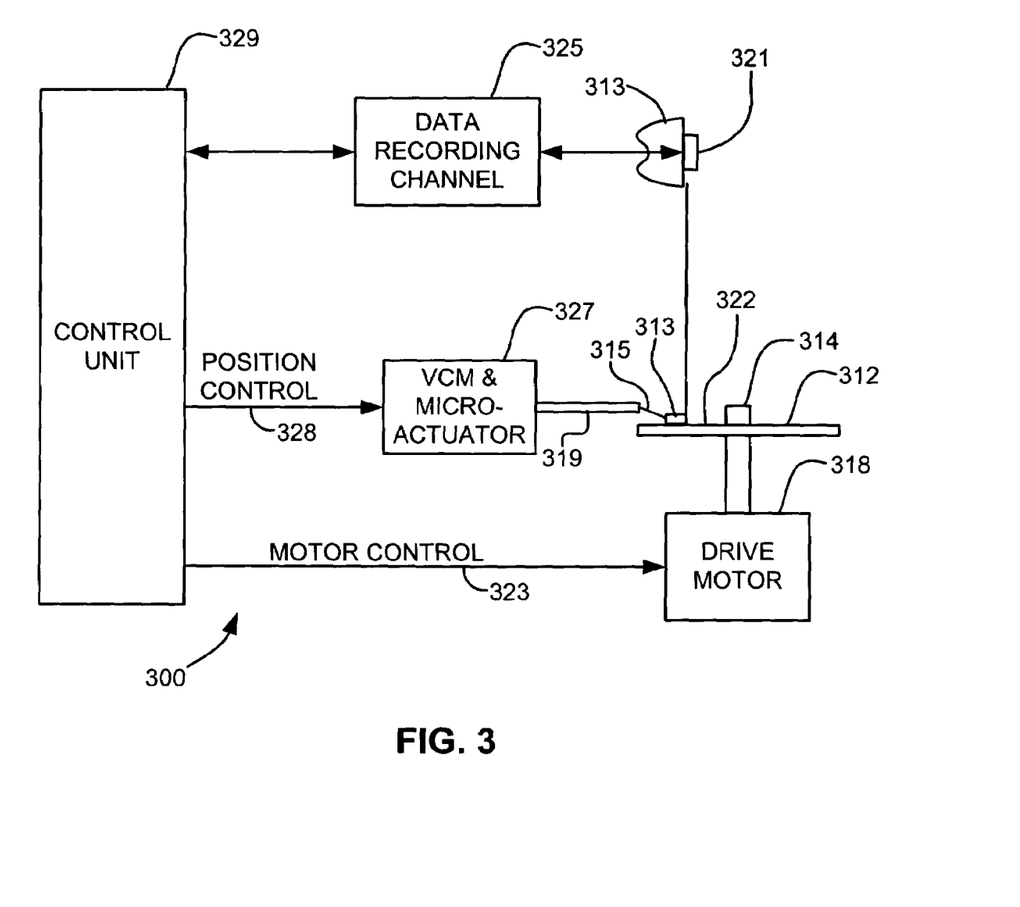
FIG. 3 is a simplified system diagram of a magnetic disk drive system in accordance with one embodiment.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording on each disk is in the form of an annular pattern of data tracks (not shown) on the disk 312.

At least one slider 313 is positioned near the disk 312, each slider 313 supporting one or more magnetic read/write heads 321. As the disks rotate, slider 313 is moved radially in and out over disk surface 322 so that heads 321 may access different tracks of the disk where desired data are recorded. Each slider 313 is attached to an actuator arm 319 by way of a suspension 315. The suspension 315 provides a slight spring force which biases slider 313 against the disk surface 322. Each actuator arm 319 is attached to an actuator means 327. The actuator means 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus-counter-balances the slight spring force of suspension 315 and supports slider 313 off and slightly above the disk surface by a certain fly height spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

The present invention provides novel write head structures each with a new bump structure that reduces the flux leakage from an upper pole tip to a lower pole tip so that the optimal writing performance can be achieved at short throat height. This new bump process can define the throat height accurately by means of a dry process. The new bump structure also provides a height sufficient to separate upper and lower pole tips of the write head, while at the same time minimizing the topography over which the upper pole tip(s) and pole(s) are formed, resulting in greater writing efficiency and track width control. The new bump structure further provides controlled P1 saturation without sacrificing the saturation necessary for efficient writing. The novel bump structure reduces the throat height to improve write efficiency for narrow track width and thin write gap length usable in current and future high density heads.

Figure 4A:
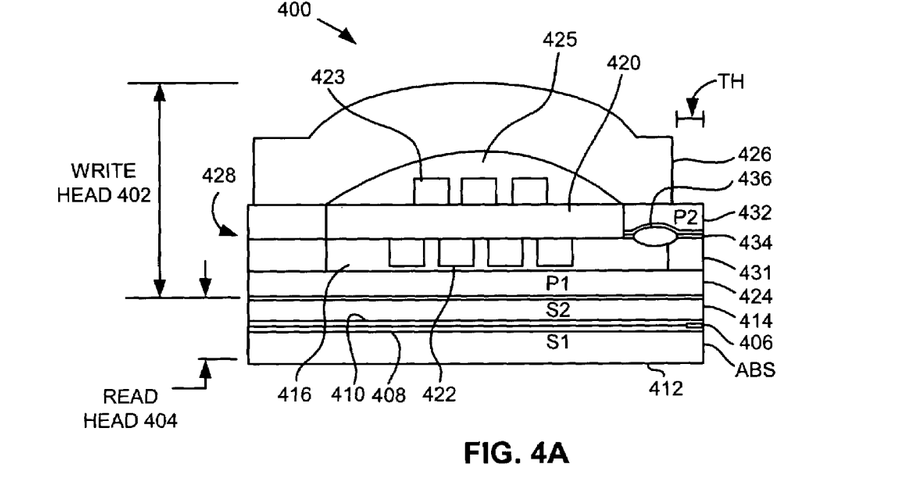
FIG. 4A is a side cross-sectional view of a magnetic head according to one embodiment.

FIG. 4A is a side cross-sectional view of a magnetic head 400 according to one embodiment. The head 400 includes a write head portion 402 and a read head portion 404, the read head portion 404 employing a sensor 406. The sensor 406 is sandwiched between nonmagnetic electrically insulative first and second read gap layers 408, 410, and the read gap layers are sandwiched between ferromagnetic first and second shield layers 412, 414. In response to external magnetic fields, the resistance of the sensor 406 changes. A sense current ($I_s$) conducted through the sensor 406 causes these resistance changes to be manifested as potential changes. These potential changes are then processed as readback signals by processing circuitry.

The write head portion 402 of the magnetic head 400 includes a first coil layer 422 embedded in a first insulation layer 416. A second insulation layer 420 is employed to planarize the second pole tip surface so that the second coil layer can be formed on a substantially planar surface. A second coil layer 423 is embedded in a third insulation layer 425. The coil layers 422, 423 and the first, second and third insulation layers 416, 420, 425 are sandwiched between lower and upper pole piece layers 424, 426. The lower and upper pole piece layers 424, 426 are magnetically coupled at a back gap 428 and have lower and upper pole tips 431, 432 which are separated by a write gap layer 434 at the ABS. In a merged head, the second shield layer 414 and the first pole piece layer 424 would be a common layer.

A bump 436 is formed such that it extends into a portion of the upper and rear ends of the lower pole tip 431 as well as into a portion of the bottom and rear ends of the upper pole tip 432. The sunken placement of the bump makes the topography very low while keeping back regions of the upper and lower pole tips 432, 431 separate.

Because the bump extends into the back edges of the upper and lower pole tips 432, 431, the throat height TH of the upper and lower pole tips 432, 431 is defined by the bump. The throat height is particularly important to define writer efficiency particularly for high tracks-per-inch (TPI) narrow pole width application. If the upper pole tip is very long in a direction perpendicular to the ABS, the field from the upper pole tip will leak into the lower pole tip, resulting in a weak field. If the field is too weak, it will not be able to create the magnetic transition on the disk. If the upper pole tip is too short, saturation of the field occurs. In other words, the field spreads out creating a broad transition width, which in turn creates side writing that can make high density recording impossible.

Figure 4B:
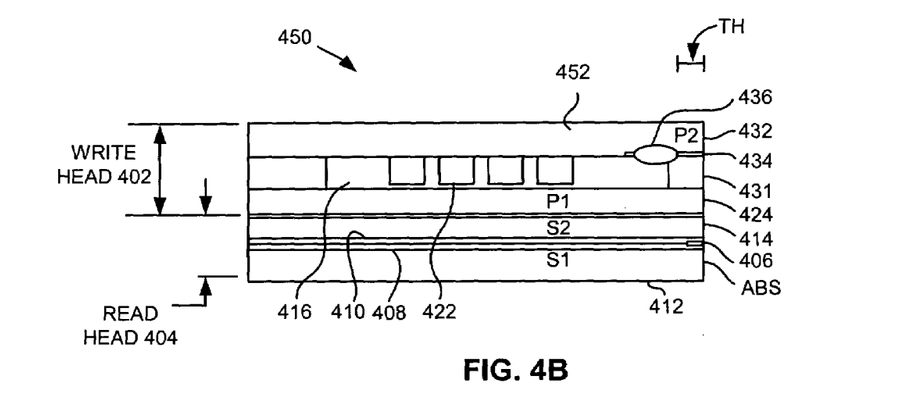
FIG. 4B is a side cross-sectional view of a magnetic head having a single layer upper pole.

FIG. 4B illustrates a single coil design 450. The structure is similar to that of FIG. 4A, except the upper pole 452 is a single layer.

Figure 5A:
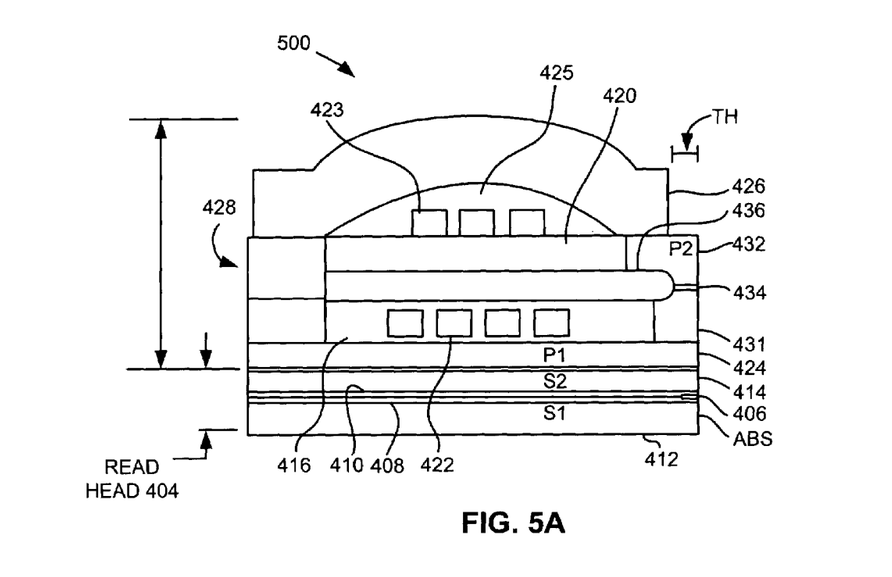
FIG. 5A is a side cross-sectional view of a magnetic head according to one embodiment.

FIG. 5 illustrates an alternate embodiment 500 in which the bump extends away from the ABS about to the back gap 428.

Figure 5B:
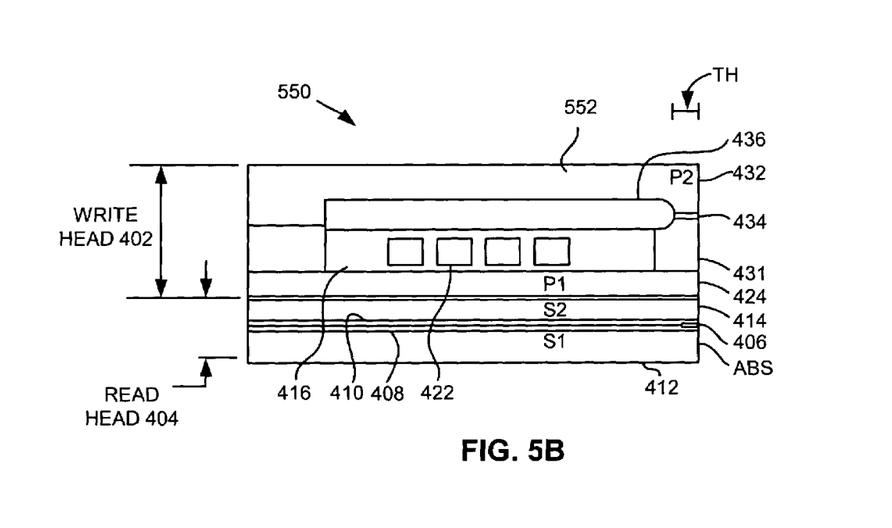
FIG. 5B is a side cross-sectional view of a magnetic head having a single layer upper pole.

FIG. 5B illustrates a single coil design 550. The structure is similar to that of FIG. 5A, except the upper pole 552 is a single layer.

The structures shown in FIGS. 4A–B and 5A–B are presented by way of example only, and the bump design can be implemented in other types of writers.

Preferred materials from which the bump can be constructed include alumina, silicon dioxide, cured resist, a nonmagnetic metal, or other nonmagnetic material, which can be electrically conductive.

The bump may be created by any suitable method, as will be understood by those skilled in the art. Following are several illustrative methods that can be used to form the bump.

FIGS. 6–9 graphically illustrate one illustrative process for forming the structure shown in FIG. 4. In this process, the bump is defined before the write gap layer.

Figure 6:
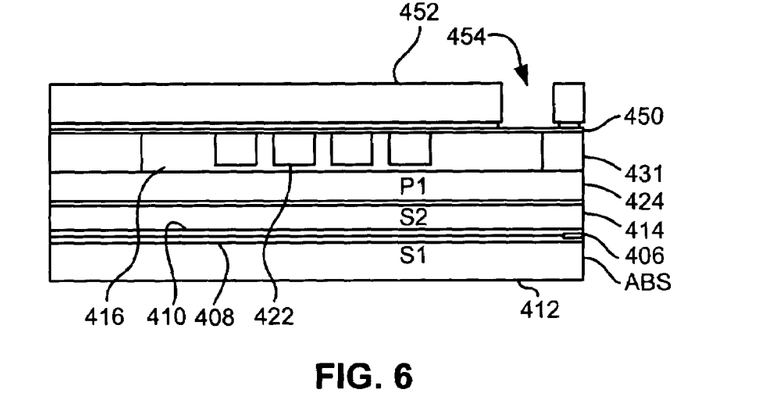
FIG. 6 is a side cross-sectional view of a structure during the formation of the head of FIG. 4A.
Figure 7:
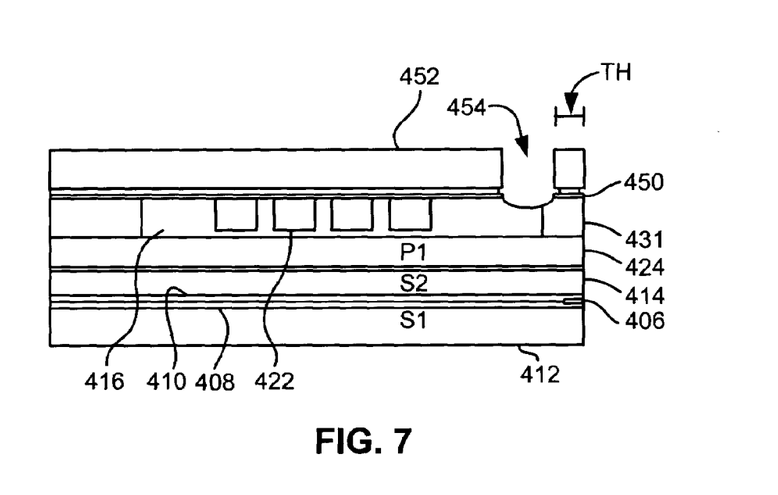
FIG. 7 is a side cross-sectional view of a structure during the formation of the head of FIG. 4A.

Referring to FIG. 6, the head 400 is formed up to the first coil layer 422 and lower pole tip 431. The lower pole tip 431 and remaining structure are planarized such as by chemical mechanical polishing (CMP) with a CMP stopper layer 450. Note that the CMP stopper layer 450 may not be required depending on the method of choice in forming the coil, the lower pole tip, and the CMP process. A bilayer resist 452 is added above the CMP stopper layer 450 and patterned to expose the bump region 454 and define the throat height TH. The structure is ion milled to form a void in the bump region 454, creating the structure shown in FIG. 7. As shown in FIG. 7, the tall resist 452 causes shadowing, which in turn causes the exposed material in the middle of the bump region 454 to be removed faster, resulting in a generally hemispherically shaped void. Note that a portion of the lower pole tip 431 is removed.

Figure 8:
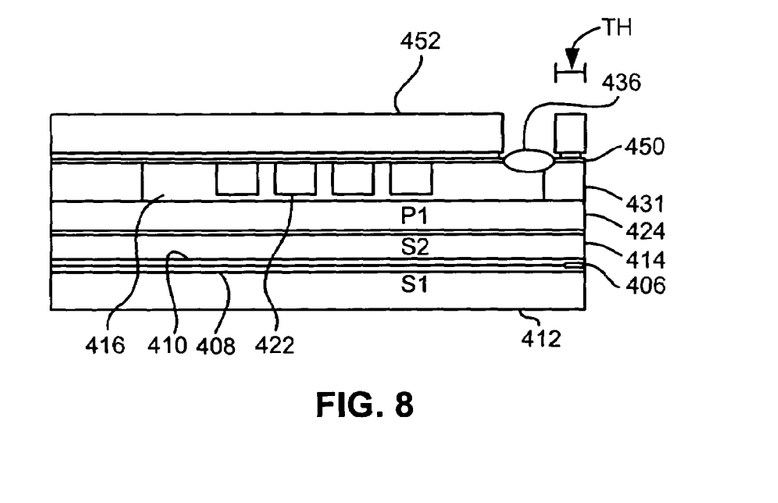
FIG. 8 is a side cross-sectional view of a structure during the formation of the head of FIG. 4A.

Referring to FIG. 8, the bump region 454 is filled with alumina or other nonmagnetic material, such as by sputter deposition. Again, the tall walls of the resist 454 create shadowing, resulting in more material being deposited in the middle of the bump region, giving the bump 436 an oval shape.

Figure 9:
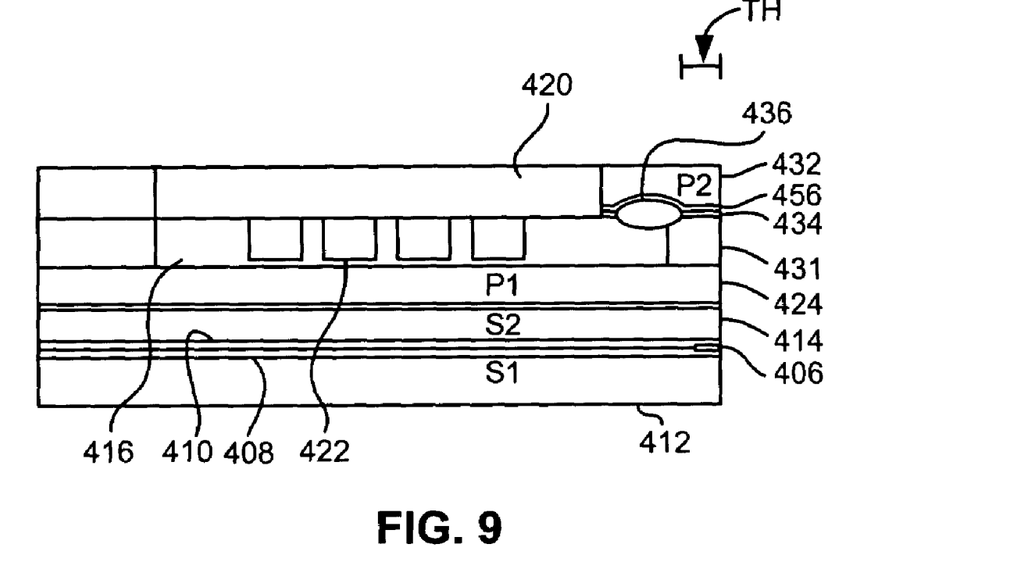
FIG. 9 is a side cross-sectional view of a structure during the formation of the head of FIG. 4A.

As shown in FIG. 9, the CMP stopper layer 450 is removed such as by reactive ion etching (RIE), and the resist 452 is removed preferably using a liftoff process. Light polishing may also be performed to remove any fencing remaining from the deposition step. The write gap layer 434, a seed layer 456 for plating, the upper pole tip 432 and the second insulation layer 420 are formed and the structure is again planarized. Then the rest of the writer is formed to create the structure shown in FIG. 4.

Figure 10:
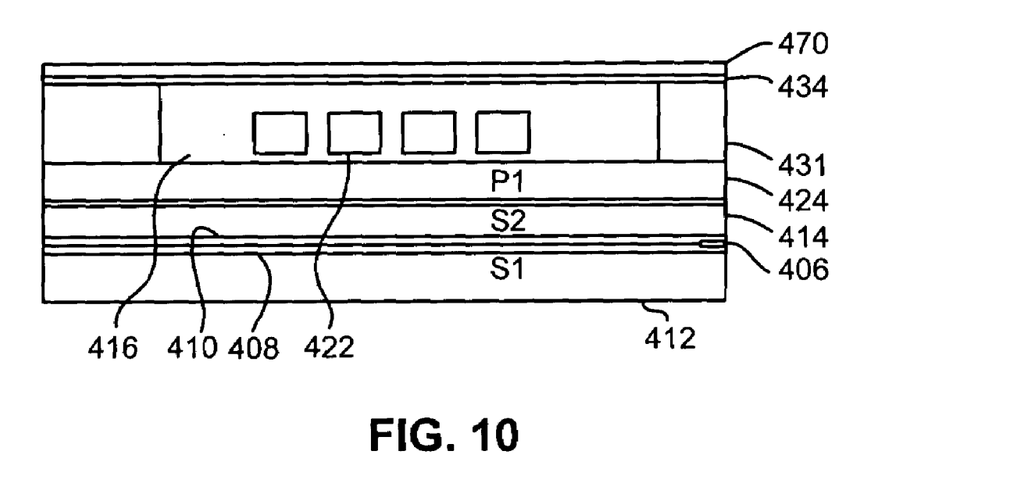
FIG. 10 is a side cross-sectional view of a structure during the formation of the head of FIG. 5A.
Figure 11:
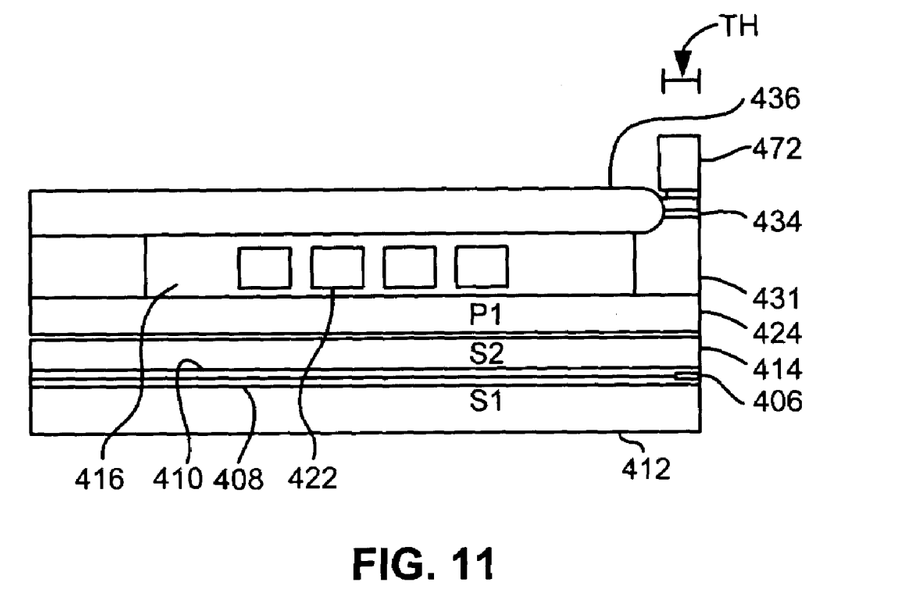
FIG. 11 is a side cross-sectional view of a structure during the formation of the head of FIG. 5A.
Figure 12:
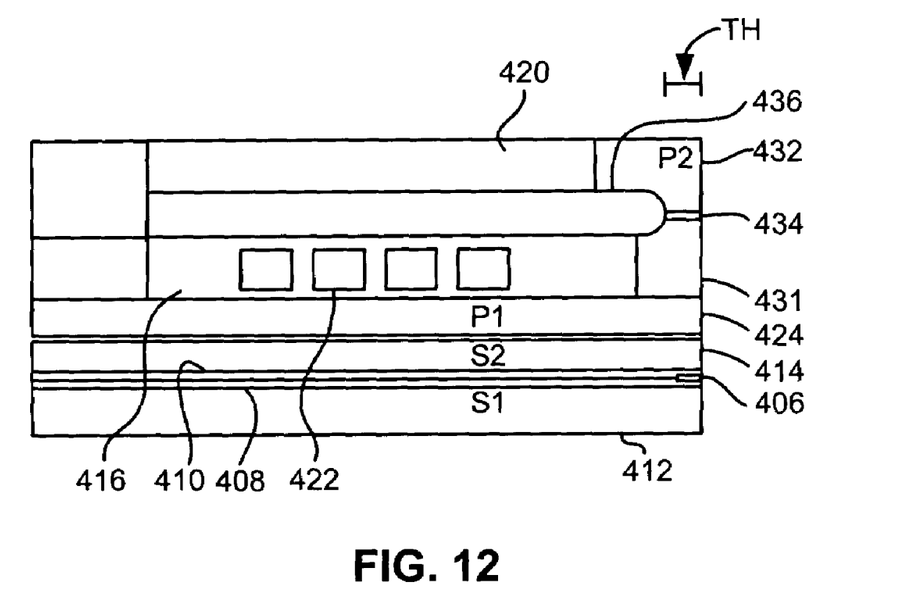
FIG. 12 is a side cross-sectional view of a structure during the formation of the head of FIG. 5A.

FIGS. 10–12 graphically illustrate an illustrative process for forming the structure shown in FIG. 5. In this process, the bump 436 is defined after the write gap layer 434 is formed.

Referring to FIG. 10, the head is formed up to the lower pole tip 431 and first insulation layer 416. A write gap layer 434 is formed above the lower pole tip 431 and first insulation layer 416. A CMP stopper layer 470 is formed above the write gap layer 434.

As shown in FIG. 11, a bilayer photoresist 472 is formed and patterned above the CMP stopper layer 470. The structure is milled to create a bump region. Then the bump 436 is formed in the bump region such as by deposition. The resist 472 and CMP stopper layer 470 are removed and the second pole tip 432 and second insulation layer 420 are formed above the bump 436/write gap layer 434, as shown in FIG. 12. Then the rest of the writer is formed to create the structure shown in FIG. 5.

While various embodiments have been described above, it should be understood that they have been presented by way of example only, and not limitation. For example, the structures and methodologies presented herein are generic in their application to all write heads mobile, desktop and server disk drives. Thus, the breadth and scope of a preferred embodiment should not be limited by any of the above-described exemplary embodiments, but should be defined only in accordance with the following claims and their equivalents.

What is claimed is:

1. A magnetic head having an air bearing surface (ABS), comprising:
    a first pole tip having an upper end;
    a second pole tip having a bottom end spaced apart from and facing the upper end of the first pole tip; and
    a bump extending into a portion of the upper end of the first pole tip in a direction towards the ABS, the bump also extending into a portion of the bottom end of the second pole tip, the bump being positioned away from the ABS.

2. The head as recited in claim 1, wherein the bump defines a throat height of the first and second pole tips.

3. The head as recited in claim 1, wherein the bump has a generally circular shape.

4. The head as recited in claim 1, wherein the bump has a generally oval shape.

5. The head as recited in claim 1, wherein the bump has a generally trapezoidal shape.

6. The head as recited in claim 1, wherein the bump tapers together towards the ABS.

7. The head as recited in claim 1, wherein the bump extends in a direction away from the ABS about to a back gap of the magnetic head.

8. The head as recited in claim 1, wherein the bump is constructed of a nonmagnetic material.

9. The head as recited in claim 8, wherein the bump is constructed of alumina.

10. The head as recited in claim 8, wherein the bump is constructed of a nonmagnetic metal.

11. The head as recited in claim 10, wherein the nonmagnetic metal is electrically conductive.

12. The head as recited in claim 8, wherein the bump is constructed of cured resist.

13. The head as recited in claim 1, wherein the bump is formed using a dry process.

14. The head as recited in claim 13, wherein the bump is formed by deposition.

15. A magnetic head having an air bearing surface (ABS), comprising:

a first pole tip having an upper end;

a second pole tip having a bottom end spaced apart from and facing the upper end of the first pole tip; and a bump extending into a portion of the upper end of the first pole tip and a portion of the bottom end of the second pole tip, the bump being positioned away from the ABS, the bump being constructed of a nonmagnetic material, wherein the bump defines a throat height of the first and second pole tips.

16. The head as recited in claim 15, wherein the bump has a generally circular shape.

17. The head as recited in claim 15, wherein the bump has a generally oval shape.

18. The head as recited in claim 15, wherein the bump has a generally trapezoidal shape.

19. The head as recited in claim 15, wherein the bump tapers together towards the ABS.

20. The head as recited in claim 15, wherein the bump extends in a direction away from the ABS about to a back gap of the magnetic head.

21. The head as recited in claim 15, wherein the bump is constructed of alumina.

22. The head as recited in claim 15, wherein the bump is constructed of a nonmagnetic metal.

23. The head as recited in claim 15, wherein the bump is constructed of cured resist.

24. The head as recited in claim 15, wherein the bump is formed using a dry process.

25. A magnetic storage system, comprising:

magnetic media;

at least one head for reading from and writing to the magnetic media, each head having an air bearing surface (ABS), each head comprising:

a sensor;

a write element coupled to the sensor, the write element comprising a first pole tip having an upper end, a second pole tip having a bottom end spaced apart from and facing the upper end of the first pole tip, and a bump extending towards the ABS into a portion of the upper end of the first pole tip and a portion of the bottom end of the second pole tip, the bump being positioned away from the ABS;

a slider for supporting the head; and a control unit coupled to the head for controlling operation of the head.

* * * * *